(No Model.)
J. G. EMERY, Jr.
SAW MILL CARRIAGE.
No. 440,144. Patented Nov. 11, 1890.
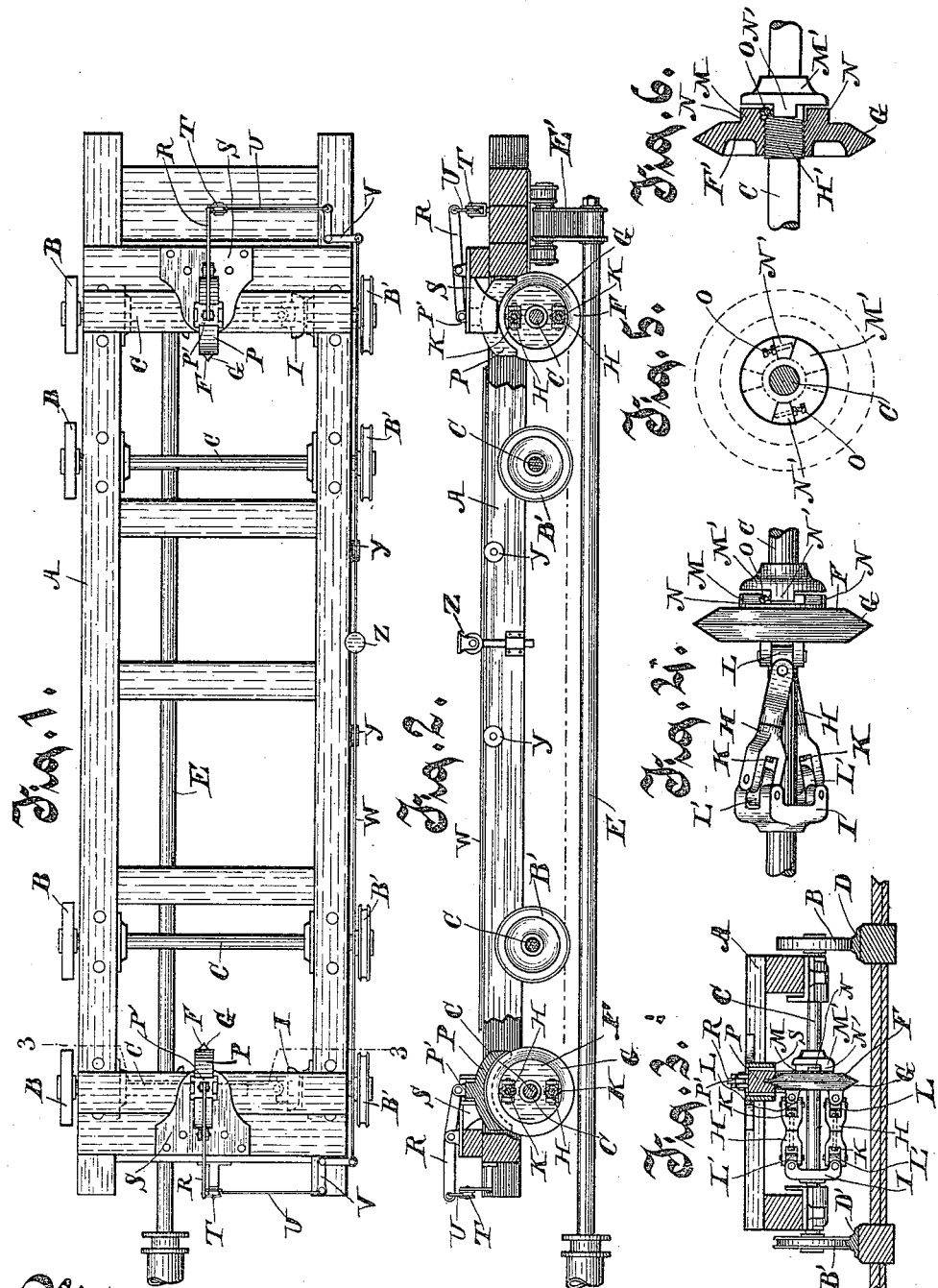
Witnesses.
C. H. Keeney,
Asma Faust,
Inventor.
John G. Emery Jr.
Ernst Benedict
Attorneys.

UNITED STATES PATENT OFFICE.

JOHN G. EMERY, JR., OF MILWAUKEE, WISCONSIN, ASSIGNOR OF ONE-FOURTH TO THE WILKIN MANUFACTURING COMPANY, OF SAME PLACE.

SAW-MILL CARRIAGE.

SPECIFICATION forming part of Letters Patent No. 440,144, dated November 11, 1890.

Application filed April 25, 1890. Serial No. 349,461. (No model.)

*To all whom it may concern:*

Be it known that I, JOHN G. EMERY, Jr., of Milwaukee, in the county of Milwaukee and State of Wisconsin, have invented new and useful Improvements in Saw-Mill Carriages; and I do hereby declare the following to be a full, clear, and exact description of said invention, reference being had to the accompanying drawings, and to the letters of reference marked thereon, which form a part of this specification.

My invention in saw-mill carriages relates particularly to the mechanism for offsetting the carriage while running back from the line of travel it had while the saw was cutting through the log and returning it to a proper position for its travel toward the saw.

In the drawings, Figure 1 is a top plan view of a saw-mill carriage having my improved mechanism embodied therewith. Fig. 2 is a side elevation of the same device shown in Fig. 1, parts being broken away to show interior construction. Fig. 3 is a vertical transverse section on line 3·3 of Fig. 1. Fig. 4 is a detail of the friction-wheel and related mechanism. Fig. 5 is an end view of the outer part of the clutch used in connection with the friction-wheel. Fig. 6 is a modified form of the friction-wheel and related mechanism.

The carriage shown in the drawings is such a one as is adapted for use with band-saw mills, the carriage being adapted to receive and carry the log thereon on head-blocks (not shown in the drawings) to and from the saw, the log being secured on the carriage near one side by dogs, (also not shown in the drawings,) so that the log projects sufficiently far beyond its edge to be cut by the saw as the carriage travels past it.

A is the frame of the carriage, which is supported and travels on the axles C C, having journal-bearings in the frame, which axles are provided with wheels B B and B′ B′. The wheels B′ B′ are grooved and travel on a rail D′, which enters the groove in the wheels, whereby the wheels are guided in their travel. The wheels B B are conveniently made with a flat periphery and travel on a flat-surfaced rail D, though these wheels B B may be grooved like the wheels B′, if desired, and arranged to travel on a rail, which, like the rail D′, will enter the groove therein and guide the wheels. Wheels having flanges like car-wheels, adapted to guide them, may be used, if preferred. The axles C C are loose in their journal-boxes, so as to have rotary movement therein, and the frame A has a limited lateral movement on the axles. The feed-rod E is connected at one end by the laterally-swinging arm E′ to the frame A, and at the other end is connected with mechanism that reciprocates it endwise, whereby the carriage is caused to travel forward and back.

For effecting the offset of the carriage-frame a friction-wheel F rides loose on one of the axles C. This friction-wheel is preferably constructed with a double-beveled edge G, and the wheel is connected movably by links or universally-jointed connecting-rods H H to a collar I, fast on the axle at a little distance from the friction-wheel. In the device shown in the drawings for connecting the friction-wheel to the collar I the rods H H are formed in two parts, joined together by the longitudinally-extending and loosely-fitted bolt K, whereby the two parts of the rod have rotary movement with reference to each other, and at one end are knuckle-jointed to the friction-wheel through the links L L, and at the other end are knuckle-jointed to the collar I through the links L′ L′. On the other side the friction-wheel F is provided with one part M of a clutch made rigid thereto, the other part of which clutch M′ rigid on the axle C. The jaws N and N′, respectively, of the parts of this clutch enter intermediate spaces or recesses of the clutch, which are so elongated or extended segmentally as to give the parts of the clutch limited rotary play on each other. The extent of this play or rotary lost motion is subject to limitation and adjustment by means of set-screws O O turning into the sides of one or more jaws, which set-screws, being adjusted out or into the jaws, are adapted to limit or extend the permissible movement of the parts of the clutch on each other.

A brake-block P is suspended on one end of a lever R, which lever is pivoted medially on a bracket S, fixed on the frame A. The brake-block P is provided with a stem or part P', which is fitted and travels vertically in ways therefor in the bracket S. The lower edge of the brake-block is curved and grooved to fit the edge of the friction-wheel F. This brake-block is of such weight as by gravity to drop and rest upon the friction-wheel F with sufficient power to hold it against rotation under a certain amount of rotary force which is sufficient to shift the carrage-frame and its load in the manner hereinafter more fully set forth. The brake-block may be raised off the friction-wheel by the operator by means of the lever R; but as two brake-blocks are preferably used—one at each end of the carriage, as shown in Figs. 1 and 2—I provide a device for connecting the outer ends of the levers R R, whereby both the brake-blocks may be raised at the same time, which device consists of the cords U U, attached at one end to the outer ends of the levers R R, running thence downwardly under the pulleys T T, and at the other ends attached to one arm of the bell-cranks V V, which bell-cranks are pivoted on the frame A, and a cord W, attached at its ends, respectively, to the other arms of the bell-cranks V V. The bell-cranks are so located that the cord W runs alongside the frame A and passes medially over two idle-pulleys Y Y, pivoted on the frame at a little distance apart, and a pedal Z, moving vertically in ways therefor in the side of the frame, is provided with an idle-pulley, which bears against the cord W in such manner that by forcing the pedal down the cord W will be carried downwardly with the pedal between the idle-pulleys Y Y, whereby the bell-cranks V V will be swung around and the brake-blocks will be raised off the friction-wheel.

By reference to the drawings and foregoing description it will be understood that the log is carried on that side of the frame which is at the top in Fig. 1, and that as the carriage is forced rearwardly toward the left the brake, acting on the friction-wheel, will hold it at rest a moment while the axle rotates, thereby twisting the rods H H from a straight position shown in Fig. 3 to the twisted position shown in Fig. 4, thus drawing the friction-wheel F and the frame of the carriage to the left, which relative position of the carriage-frame to the axles will be maintained until the endwise movement of the carriage is reversed, thus offsetting the log from the saw while the carriage is running back, and on starting the carriage in the opposite direction the friction-wheel will be held by the brake a moment while the axle rotates, forcing the rods H H into a position parallel with the axle, whereby the friction-wheel will be forced away from the collar I, carrying the carriage-frame with it laterally. The extent of the rotation of the friction-wheel on the axle would be limited by the twisting capability of the rods H H; but in order not to strain these rods the clutch is used, which becomes a positive means of limiting the extent of the rotation of the friction-wheel on the axle. The bearing of the brake on the friction-wheel is such as to hold the friction-wheel against rotation until the engagement of the clutch rotates the friction-wheel with the axle, notwithstanding the pressure of the brake.

The extent of the lateral movement of the carriage-frame for the purpose of offsetting is very small, and if at any time this offset is not required the lateral movement of the carriage-frame can be obviated by raising the brake-blocks off the friction-wheels by depressing the pedal Z or otherwise, when the friction-wheels will rotate freely with the axles and no lateral movement of the carriage-frame or set-off will take place. An important advantage of this method of effecting the offset of the carriage-frame is that by reason of the construction of the device—particularly of the connecting-rods H H—the beginning of the lateral movement of the carriage-frame away from the saw is very slow, increasing in rapidity as the torsion of the rods is increased, and when the reverse movement takes place the more rapid movement of the carriage occurs at first, the carriage-frame coming up to its position in front of the saw with a very slow movement at its close, thus avoiding a shock or sudden movement at the time when such shock is most to be avoided.

In the modified form of friction-wheel and related mechanism shown in Fig. 6 I provide a screw H' about the axle, which may be conveniently constructed in the form of a sleeve integral with the part M' of the clutch, which is fixed to the axle, and the friction-wheel F' is provided with a screw-thread adapted to turn on the screw H'. This form of device obviates the use of the collar I and connecting-rods H H, (shown in the other form of device,) the screw H' serving to move the friction-wheel and the thereto-secured carriage-frame through the brake-block P laterally to effect the desired offset.

What I claim as new, and desire to secure by Letters Patent, is—

1. In a saw-mill carriage having a frame supported and movable laterally on axles provided with wheels traveling and guided on rails, and means connected to the carriage-frame for reciprocating it endwise, the combination of a friction-wheel loose on an axle but so connected thereto as to permit a limited rotation of the axle therein and at the same time to be thereby carried laterally a little distance, and a brake-block secured movably in the frame and riding on the friction-wheel, substantially as described.

2. In a saw-mill carriage, a carriage-frame supported and movable laterally on the axles, having wheels constructed and arranged to support and guide the carriage on rails therefor, the combination of a friction-wheel loose on an axle, a collar rigid on the same axle at a distance from the friction-wheel, rods connected by universal joints to the friction-wheel and to the collar, and a brake sliding in ways in the frame and resting upon the friction-wheel, substantially as described.

3. In a saw-mill carriage having a frame supported and movable laterally on axles provided with wheels traveling and guided on rails and means connected to the carriage-frame for reciprocating it endwise, the combination of a friction-wheel loose on an axle, a collar fast on the axle at a distance from the friction-wheel, connecting-rods jointed to the friction-wheel and to the collar, a clutch one part of which is fixed to the friction-wheel and the other part of which is fixed to the axle, the jaws of which clutch are arranged to permit a limited rotary movement of the friction-wheel on the axle, and a brake-block secured movably in the frame and riding on the friction-wheel, substantially as described.

4. In a saw-mill carriage having a friction-wheel riding on the axle, a clutch formed in two parts, one part of which is secured to the friction-wheel and the other part of which is secured to the axle, the jaws of which parts of the clutch are arranged with alternating spaces, whereby limited rotary movement of the friction-wheel is provided for, and set-screws turning into the sides of the jaws of the clutch, whereby the amount of the rotary movement of the friction-wheel may be regulated, substantially as described.

5. In a saw-mill carriage having a frame movable laterally on the axles, the combination of a friction-wheel loose on the axle, a collar rigid to the axle at a distance from the friction-wheel, and connecting-rods formed in two parts jointed together rotatably with reference to each other, and knuckle-jointed at their ends to the friction-wheel and to the collar on the axle, respectively, substantially as described.

6. In a saw-mill carriage having a frame supported and movable laterally on axles provided with wheels traveling on guiding-rails, a friction-wheel carried on and connected movably to an axle of the carriage, and a brake-block supported and traveling vertically in ways in the frame and adapted to rest and ride on the friction-wheel, substantially as and for the purpose set forth.

7. In a saw-mill carriage having a carriage-frame supported and movable laterally on axles provided with wheels traveling on guiding-rails, the combination, with a friction-wheel rotatable limitedly on an axle and connected movably thereto, of a brake-block moving vertically in the carriage-frame and resting suspended above the friction-wheel on a lever pivoted on the frame, substantially as described.

8. In a saw-mill carriage having a frame supported and movable laterally on the axles, the combination, with two friction-wheels, one near each end of the carriage and each supported movably on and connected to an axle, of two vertically-moving brake-blocks suspended above the friction-wheels on levers pivoted in the frame, a cord, as W, running alongside the frame and connected at its end through bell-cranks to the brake-block-supporting levers, and means for depressing the cord centrally, substantially as described.

In testimony whereof I affix my signature in presence of two witnesses.

JOHN G. EMERY, JR.

Witnesses:
C. T. BENEDICT,
ANNA FAUST.